US012802065B2

(12) United States Patent
Kolekar et al.

(10) Patent No.: US 12,802,065 B2
(45) Date of Patent: Nov. 17, 2026

(54) METHOD AND SYSTEM FOR DIRECT PAYMENTS IN METAVERSE USING ANY METAVERSE CURRENCY

(71) Applicant: Mastercard International Incorporated, Purchase, NY (US)

(72) Inventors: Czaee Shefali Kolekar, Bhopal (IN); Rohith V. H, Arsikere (IN); Eepsa Malhotra, Mumbai (IN); Ankita Singhania, Howrah (IN); Jagat Narayan Sabat, Mumbai (IN); Drishti Asrani, Mumbai (IN); Jaideep Tanwar, New Delhi (IN)

(73) Assignee: Mastercard International Incorporated, Purchase, NY (US)

( * ) Notice: Subject to any disclaimer, the term of this patent is extended or adjusted under 35 U.S.C. 154(b) by 121 days.

(21) Appl. No.: 18/418,682

(22) Filed: Jan. 22, 2024

(65) Prior Publication Data

US 2025/0238791 A1 Jul. 24, 2025

(51) Int. Cl.
*G06Q 20/38* (2012.01)
*G06Q 20/36* (2012.01)
*G06Q 20/40* (2012.01)

(52) U.S. Cl.
CPC ..... *G06Q 20/3823* (2013.01); *G06Q 20/3674* (2013.01); *G06Q 20/3825* (2013.01); *G06Q 20/3829* (2013.01); *G06Q 20/401* (2013.01)

(58) Field of Classification Search
CPC ........... G06Q 20/3823; G06Q 20/3674; G06Q 20/3825; G06Q 20/3829; G06Q 20/401
See application file for complete search history.

(56) References Cited

U.S. PATENT DOCUMENTS 8,790,183 B2 7/2014 Ganz et al.
10,565,645 B1 2/2020 Kurani
(Continued)

FOREIGN PATENT DOCUMENTS

KR 20230061112 A 5/2023

OTHER PUBLICATIONS

Notification of Transmittal of the International Search Report and the Written Opinion of the International Searching Authority, or the Declaration, issued on Apr. 16, 2025, in corresponding International Application No. PCT/US2024/060929, 9 pages.
(Continued)

*Primary Examiner* — Jalatee Worjloh
(74) *Attorney, Agent, or Firm* — PANITCH SCHWARZE BELISARIO & NADEL LLP

(57) ABSTRACT

A method for facilitating direct metaverse payments via metaverse currency without direct currency conversion includes: receiving a transaction request from a computing device including a desired metaverse currency, one or more desired products, and a wallet identifier for a first blockchain wallet associated with the desired metaverse currency; determining (i) a preferred transaction amount for a preferred metaverse currency based on the desired products, and (ii) a desired transaction amount for the desired metaverse currency based on the preferred transaction amount and an exchange rate; authenticating a balance of the first blockchain wallet greater than the desired transaction amount based on the wallet identifier; and transmitting a destination address for a second blockchain wallet associated with the desired metaverse currency and the desired transaction amount to the computing device.

14 Claims, 6 Drawing Sheets

(56) References Cited

U.S. PATENT DOCUMENTS

| | | | |
|---|---|---|---|
| 2011/0014985 A1 | 1/2011 | Park et al. | |
| 2015/0332256 A1 | 11/2015 | Minor | |
| 2017/0364999 A1 | 12/2017 | Herriger et al. | |
| 2022/0122062 A1 | 4/2022 | Mayblum et al. | |
| 2023/0082506 A1 | 3/2023 | Liu | |
| 2023/0298008 A1 | 9/2023 | Sarin | |
| 2023/0298100 A1 | 9/2023 | Kurani | |
| 2023/0351353 A1* | 11/2023 | Saraf | G06Q 30/0613 |
| 2024/0281781 A1* | 8/2024 | Agarwal | G06F 3/011 |
| 2024/0378594 A1* | 11/2024 | Schoof | H04L 9/50 |
| 2025/0069070 A1* | 2/2025 | Ravinathan | G06Q 20/12 |
| 2025/0156828 A1* | 5/2025 | Sliwka | G06Q 20/02 |

OTHER PUBLICATIONS

Ambolis, Diana, “Top 10 Use Cases of Metaverse Currency Beyond Virtual Transactions”, Blockchain Magazine, Jul. 12, 2023, 7 pgs.

* cited by examiner

METHOD AND SYSTEM FOR DIRECT PAYMENTS IN METAVERSE USING ANY METAVERSE CURRENCY

FIELD

The present disclosure relates to direct payments in the metaverse using any metaverse currency, specifically with the use of an exchange platform and clearing which enable any metaverse player to exchange the varied currency payments received for their respective metaverse currency.

BACKGROUND

Metaverse platforms have seen greatly increased interest in participation in recent years. Many of these platforms envision the metaverse as a new form of Internet, giving people a place to interact and share content in a virtual reality space that is more akin to a virtual version of the real world. To facilitate the exchange of goods and services in the metaverse, these platforms often have a cryptographic currency associated therewith that is exchanged via a blockchain. Each user in the metaverse can have a blockchain wallet that is used to send and receive the currency used by that metaverse.

Such a system for currency exchange can be useful and convenient in a single metaverse. However, there is a wide variety of metaverses currently available and being produced, resulting in a similar number of different cryptographic currencies being used, where each metaverse uses their own associated currency. For users, this can become extremely complicated as they would need to manage a different blockchain wallet for each metaverse and associated currency and keep apprised of the different relative values of each currency. Merchants would be required to do the same or would have to restrict payments to only specific metaverse currencies, limiting spends in the metaverse, potentially reducing customer base and significantly decrease their revenue.

Thus, there is a need for a technological solution that enables a merchant in a metaverse to accept payment from users via any type of metaverse currency while still enabling the merchant to maintain their own funds in their desired currency.

SUMMARY

The present disclosure provides a description of systems and methods for facilitating direct metaverse payments via metaverse currency without direct currency conversion. A transaction request can be received by a metaverse merchant from a user device. The transaction request includes at least one or more products the user wants to purchase, their desired metaverse currency, and an identifier associated with the user's blockchain wallet. The metaverse merchant determines the transaction amount for the one or more products in their own preferred metaverse currency and, based on an exchange rate between the two currencies, determines the equivalent amount in the user's desired metaverse currency. The metaverse merchant then authenticates the user's blockchain wallet and ensures that the wallet has sufficient balance to cover the determined equivalent amount of the user's desired metaverse currency. If so, the metaverse merchant transmits a destination address for their own blockchain wallet with the equivalent amount of the user's desired metaverse currency for use by the user in submitting a new blockchain transaction transferring that amount to the metaverse merchant. This results in the user transacting with their desired currency regardless of what currency is preferred by the metaverse merchant. Following the transaction, the metaverse merchant can transfer the payment received in the user's desired metaverse currency to an exchange platform. The exchange platform can maintain an accounting for the metaverse merchant and receive all payments made to the metaverse merchant in users' desired currencies and, at a predetermined time (e.g., daily, when the total amount exceeds a predetermined value, etc.), perform a clearing process to transfer the appropriate amount of the metaverse merchant's preferred metaverse currency to the metaverse merchant. This results in the metaverse merchant receiving all payments in their preferred currency while accepting all payments of any type of currency from users.

A method for facilitating direct metaverse payments via metaverse currency without direct currency conversion includes: receiving, by a receiver of a processing server, a transaction request from a computing device, the transaction request including at least a desired metaverse currency, one or more desired products, and a wallet identifier for a first blockchain wallet associated with the desired metaverse currency; determining, by a processor of the processing server, (i) a preferred transaction amount for a preferred metaverse currency based on at least the one or more desired products, and (ii) a desired transaction amount for the desired metaverse currency based on at least the preferred transaction amount and an exchange rate; authenticating, by the processor of the processing server, a balance of the first blockchain wallet based on at least the wallet identifier, wherein the balance is greater than or equal to the determined desired transaction amount; and transmitting, by a transmitter of the processing server, at least a destination address for a second blockchain wallet associated with the desired metaverse currency and the desired transaction amount to the computing device.

A system for facilitating direct metaverse payments via metaverse currency without direct currency conversion includes: a computing device; and a processing server, the processing server including a receiver receiving a transaction request from the computing device, the transaction request including at least a desired metaverse currency, one or more desired products, and a wallet identifier for a first blockchain wallet associated with the desired metaverse currency, a processor determining (i) a preferred transaction amount for a preferred metaverse currency based on at least the one or more desired products, and (ii) a desired transaction amount for the desired metaverse currency based on at least the preferred transaction amount and an exchange rate, and authenticating a balance of the first blockchain wallet based on at least the wallet identifier, wherein the balance is greater than or equal to the determined desired transaction amount, and a transmitter transmitting at least a destination address for a second blockchain wallet associated with the desired metaverse currency and the desired transaction amount to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Facilitating Direct Metaverse Payments

Figure 1:
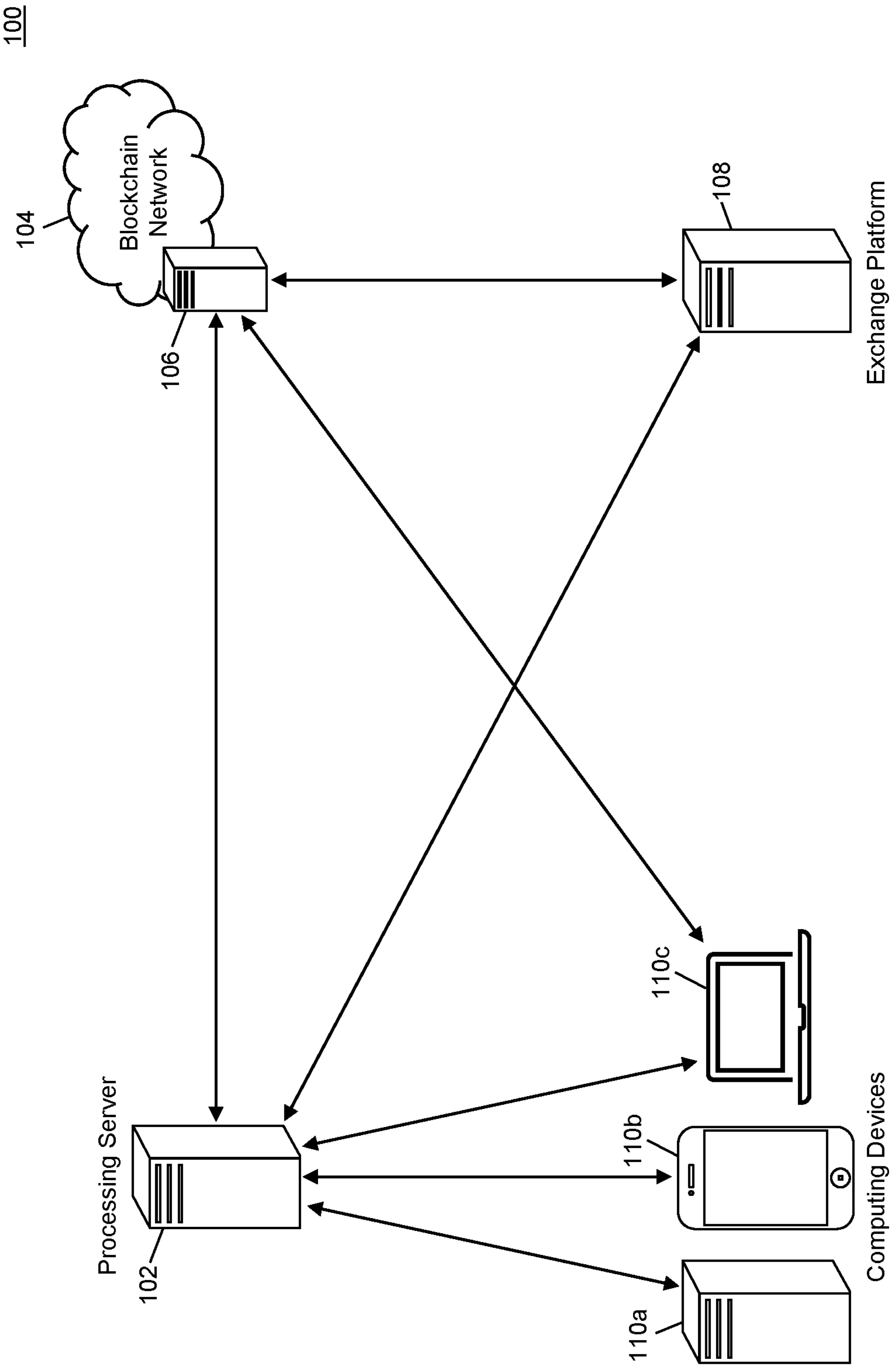
FIG. 1 is a block diagram illustrating a high-level system architecture for secure facilitating direct metaverse payments in accordance with exemplary embodiments.
Figure 2:
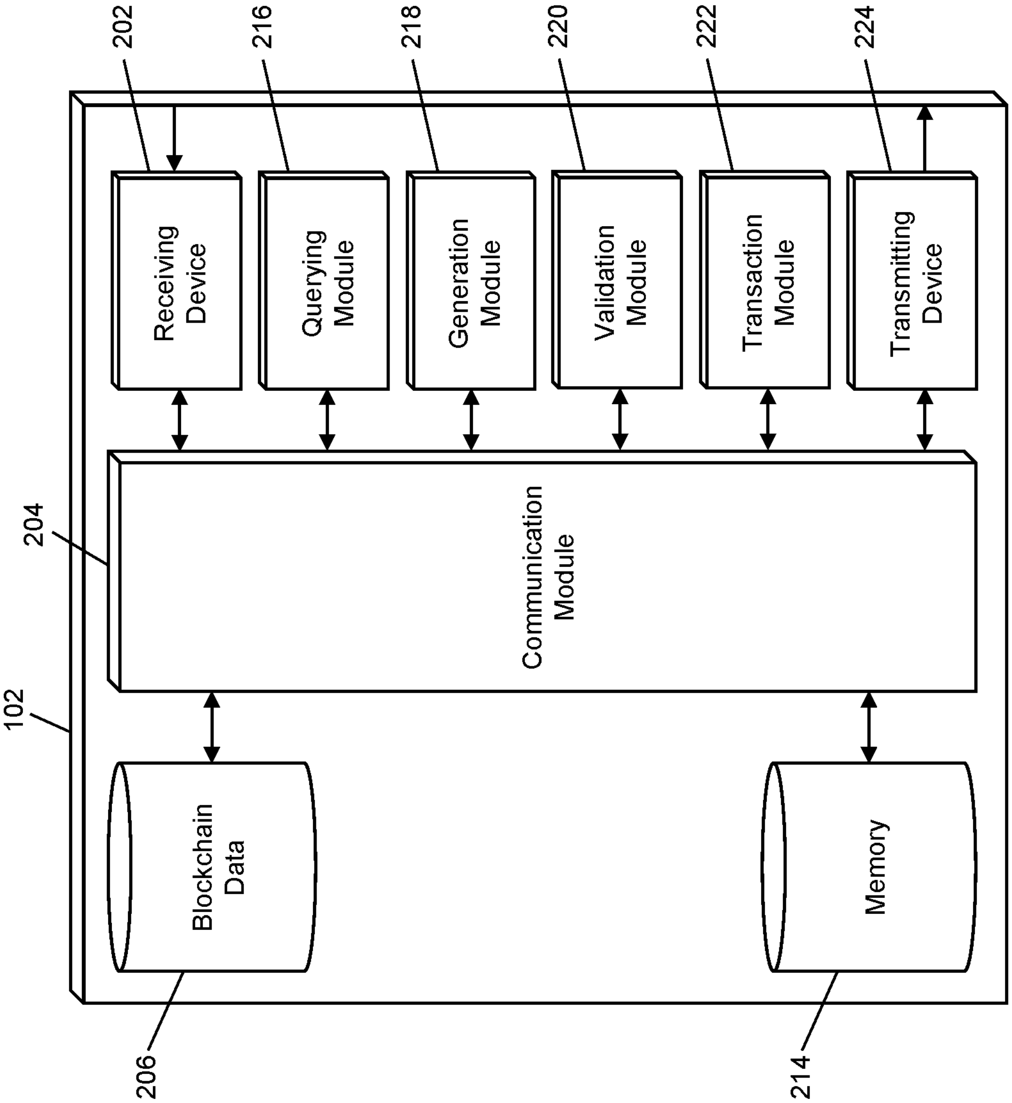
FIG. 2 is a block diagram illustrating a processing server in the system of FIG. 1 for facilitating direct metaverse payments in accordance with exemplary embodiments.
Figure 5:
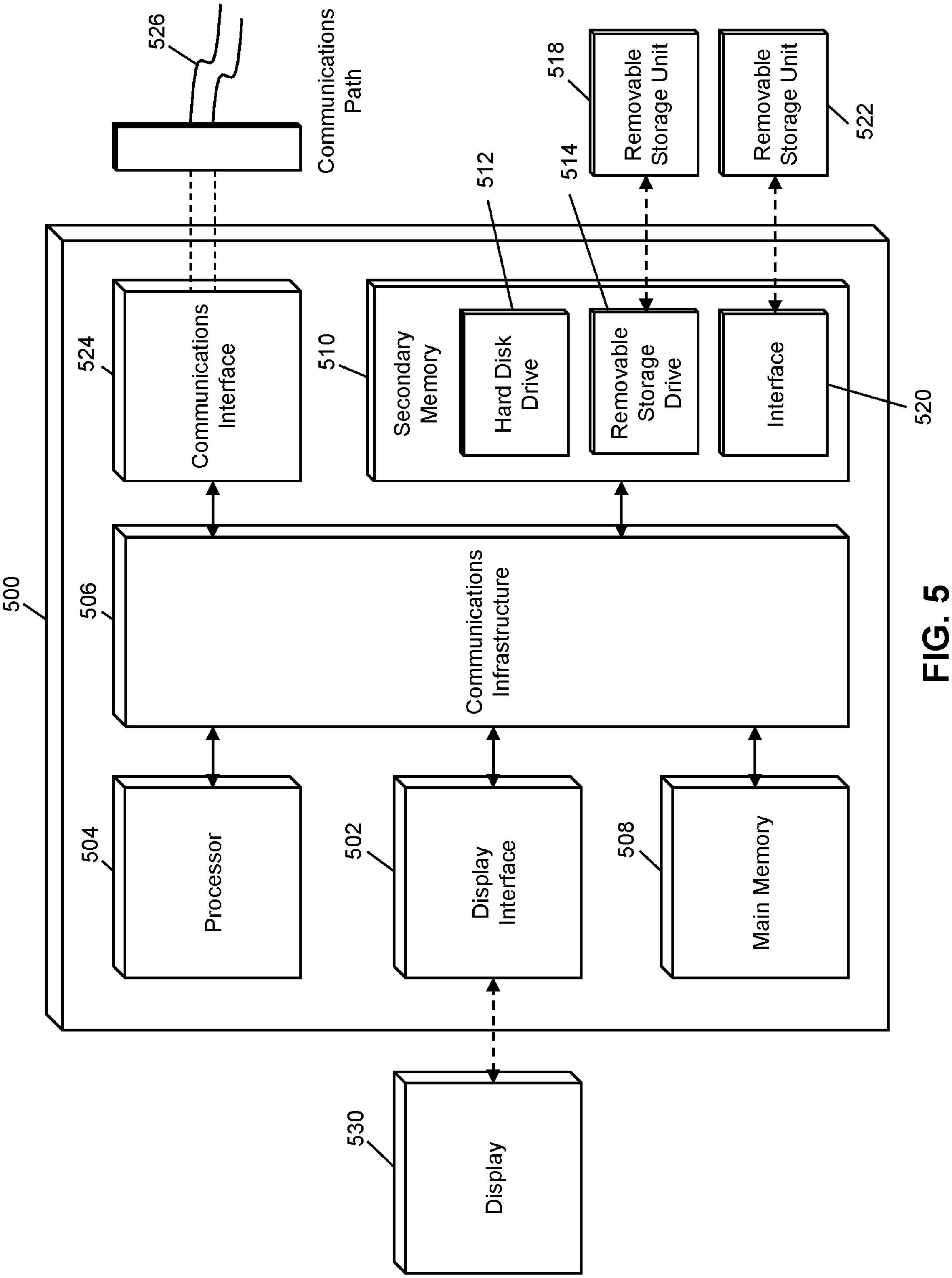
FIG. 5 is a block diagram illustrating a computer system architecture in accordance with exemplary embodiments.

FIG. 1 illustrates a system 100 for the facilitation of direct cryptocurrency payments in a metaverse without the need for direct currency conversion. The system 100 can include a processing server 102. The processing server 102, discussed in more detail below, can be a computing system, such as illustrated in FIG. 2 or 5, discussed in more detail below, of an entity that can accept payment for goods or services via a metaverse currency, such as a metaverse merchant. In an exemplary embodiment, the processing server 102 can accept payment for any metaverse currency that utilizes a blockchain for the transfer thereof via a blockchain wallet.

In the system 100, blockchains can be operated by a blockchain network 104. The blockchain network 104 can be comprised of a plurality of blockchain nodes 106. Each blockchain node 106 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. Each metaverse currency can be associated with a blockchain. Thus, while only a single blockchain network 104 is illustrated, it can be appreciated that any number of blockchain networks 104 can be a part of the system 100. In some cases, a single blockchain network 104 can manage a single blockchain for a single metaverse currency. In other cases, a blockchain network 104 can manage multiple blockchains for multiple respective metaverse currencies.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in a blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective blockchain network 104 using the public key of the cryptographic key pair. In some cases, the term "blockchain wallet" can refer specifically to the private key. In other cases, the term "blockchain wallet" can refer to a computing device (e.g., processing server 102) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender that is generated using the sender's private key, a blockchain address of the recipient of currency generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in a blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

The system 100 can include a plurality of computing devices 110. Each computing device 110 can be a desktop computer, laptop computer, notebook computer, tablet computer, cellular phone, smart phone, smart watch, smart television, wearable computing device, implantable computing device, or other device configured to perform the functions discussed herein. Each computing device 110 can be associated with a user that is interested in conducting a transaction with the processing server 102 of a metaverse merchant. In some cases, multiple computing devices 110 can be interested in using different metaverse currencies for transactions. For example, computing device 110*a* can request to transact with a first metaverse currency, $C_1$, the computing device 110*b* can request to transact with a second metaverse currency, $C_2$, and the computing device 110*c* can request to transact with a third metaverse currency, $C_3$. Each computing device 110 can be interested in transacting with a different metaverse currency than a metaverse currency preferred by the merchant, referred to herein as a preferred metaverse currency, $C_P$.

When a user is interested in transacting with a metaverse merchant, the user can submit a transaction request via their computing device 110 to the processing server 102 of the metaverse merchant using a suitable communication network and method, such as via an interface within a metaverse. The transaction request can include the one or more products or services that the user is interested in purchasing, an indication of the desired metaverse currency, $C_D$, the user wants to use to fund the transaction, as well as an identifier associated with the blockchain wallet of the computing device 110 that will be used to fund the transaction. The identifier can be a public key of the cryptographic key pair that comprises the computing device's blockchain wallet. In some cases, the transaction request can also include information regarding a balance of the blockchain wallet in $C_D$, such as one or more unspent transaction outputs, and a digital signature over the information generated using the private key of the cryptographic key pair comprising the computing device's blockchain wallet.

The processing server 102 can receive the transaction request and determine the transaction amount for the desired transaction in the metaverse merchant's preferred metaverse currency based on the indicated one or more products. The processing server 102 can then determine an equivalent transaction amount in $C_D$ based on an exchange rate between $C_D$ and $C_P$ and the transaction amount determined by the processing server 102 for the transaction in $C_P$. In some cases, the exchange rate can be provided by an exchange platform 108, discussed in more detail below. In other cases, the exchange rate can be provided by and/or determined by the processing server 102. In some cases, the processing server 102 can provide the equivalent transaction amount in $C_D$ to the computing device 110 for confirmation by the user on the amount prior to proceeding with the transaction.

In some embodiments, the processing server 102 can be configured to verify that the computing device's blockchain wallet has sufficient metaverse currency in their desired metaverse currency to cover the determined equivalent transaction amount in the metaverse merchant's preferred metaverse currency. In instances where the transaction request includes balance information, the processing server 102 can use the information to verify that the unspent transaction output(s) for the computing device's blockchain wallet are greater than or equal to the equivalent transaction amount in $C_D$. In other instances, the processing server 102 can transmit the equivalent transaction amount in $C_D$ to the computing device 110 in a request for balance verification. The computing device 110 can then determine that it can cover the equivalent transaction amount and provide a positive verification to the processing server 102. The positive verification can include the proof of the balance (e.g., unspent transaction outputs) or a certification that the amount can be covered. In some cases, the verification or certification can be digitally signed by the blockchain wallet's private key. In such cases, the processing server 102 can verify the digital signature using a public key of the computing device's blockchain wallet.

In some cases, the processing server 102 can also be configured to authenticate the blockchain wallet, which can be performed prior to verifying the sufficient funding of the blockchain wallet. Authentication of the blockchain wallet can be performed via the verification of a digital signature generated via the private key of the computing device's blockchain wallet using the public key of the computing device's blockchain wallet, which can be retrieved from the transaction request. In cases where the processing server 102 receives digitally signed balance information from the computing device 110, authentication of the blockchain wallet can be performed at the same time as verification of the balance sufficiency for the blockchain wallet via verification of the digital signature and the digitally signed balance data.

Once the processing server 102 has verified the balance sufficiency of the blockchain wallet, the processing server 102 can facilitate the cryptocurrency transaction for payment of the equivalent transaction amount of $C_D$ from the computing device's blockchain wallet to a blockchain wallet of the processing server 102 on the same blockchain. In some embodiments, the processing server 102 can generate a destination address for its blockchain wallet using a public key of the cryptographic key pair of the blockchain wallet, which can be transmitted to the computing device 110 using a suitable communication network and method. The computing device 110 can then submit a new blockchain transaction to a blockchain node 106 in the blockchain network 104 associated with the desired metaverse currency for transfer of the equivalent transaction amount of $C_D$ from the computing device 110 to the processing server 102 using the provided destination address and other suitable data, such as digitally signed unspent transaction outputs. In other embodiments, the processing server 102 can submit the new blockchain transaction to a blockchain node 106 for the transfer of the equivalent transaction amount of $C_D$ from the computing device 110 to the processing server 102 using the generated destination address and other data provided by the computing device 110, such as in the transaction request or subsequent transmission. Once the transaction has been submitted, or after verifying successful addition to the blockchain, the metaverse merchant can finalize the transaction with the user, such as by providing the transacted—for goods or services to the user.

The blockchain node 106 that receives the transaction can verify the submitted blockchain transaction and add it to the blockchain for the desired metaverse currency using traditional systems and methods. Once the new transaction has been added to the blockchain, the processing server 102 and/or computing device 110 can verify that the blockchain transaction was successfully added to the blockchain for the equivalent transaction amount in $C_D$ transferred from the computing device 110 to the blockchain wallet of the metaverse merchant, e.g., the processing server 102.

In order for the metaverse merchant, e.g., the processing server 102 to receive payment via any metaverse currency desired by users but still operate using their preferred metaverse currency, the system 100 can further include an exchange platform 108. The exchange platform 108 can be an entity that is configured to exchange metaverse currencies from one currency to another. The exchange platform 108 can be a metaverse merchant, e.g., the processing server 102, a blockchain node 106, or an entity that receives payment in one metaverse currency in exchange for making a payment in a second metaverse currency using a specified exchange rate.

In some embodiments, the exchange platform 108 can publish its exchange rates between metaverse currencies. In such embodiments, the processing server 102 can identify the published exchange rate between $C_D$ and $C_P$ after receipt of a transaction request for use in determining the equivalent transaction amount in $C_D$ after determining the transaction amount in $C_P$ for the requested transaction. In other embodiments, the processing server 102 can request the exchange rate between $C_D$ and $C_P$ when determining the equivalent transaction amount or provide the determined transaction amount in $C_P$ to the exchange platform 108 and receiving the equivalent transaction amount in $C_D$ back from the exchange platform 108.

In the system 100, the exchange platform 108 can be used for settlement of metaverse currencies to enable metaverse merchants, e.g., the processing servers 102, to receive payment with any supported metaverse currency but still operate using their preferred metaverse currency. After the new blockchain transaction between the computing device 110 and the processing server 102 has been added to the blockchain, the processing server 102 can transfer the received amount of $C_D$ from their blockchain wallet to the exchange platform 108, such as to a blockchain wallet that uses $C_D$ as specified by the exchange platform 108. The exchange platform 108 can, for instance, publish the public key for the blockchain wallet for each metaverse currency or provide the public key or a destination address for a blockchain wallet when providing an exchange rate or equivalent transaction amount, which the processing server 102 can use when making payment.

The exchange platform 108 can receive payments from the processing server 102 in a variety of metaverse currencies following transactions involving the processing server 102 and the computing devices 110. When ready, the exchange platform 108 can perform a settlement process to transfer an amount of the metaverse merchant's preferred metaverse currency to the blockchain wallet for $C_P$ of the processing server 102, where the amount is based on an exchange of all of the payments made by the processing server 102 to $C_P$ using the appropriate exchange rates. In cases where the exchange rates can change between settlement processes, the exchange rate used can be the exchange rate that is provided to the processing server 102 before a new transaction, e.g., at the time of the transaction, or the exchange rate when the equivalent transaction amount of $C_D$ is transferred to the exchange platform 108 by the processing server 102, e.g., the time when the processing server 102 sends the equivalent transaction amount of $C_D$ to the exchange platform 108. The result of the settlement process is that the metaverse merchant receives payment via any accepted metaverse currency from users, but in the end receives only their preferred metaverse currency.

In some embodiments, the settlement process can be performed by the exchange platform 108 at a predetermined time interval, such as hourly, daily, weekly, etc. In other embodiments, the settlement process can be performed by the exchange platform 108 at another predetermined interval, such as after a predetermined number of transfers to the exchange platform 108 (e.g., after 10 transactions, 50 transactions, 100 transactions, etc.), or when the amount of preferred metaverse currency to be paid out to the metaverse merchant reaches a predetermined amount. In some cases, the processing server 102 can request settlement to be performed, which can occur in place of automated settlement or in addition to automated settlement.

In some embodiments, the exchange platform 108 can operate blockchain wallets for use in receiving funds by metaverse merchants, e.g., the processing servers 102, from computing devices 110. In some cases, the exchange platform 108 can have a blockchain wallet for the processing server 102 for each metaverse currency, and provide the destination addresses and/or public keys to the processing server 102 for use in the blockchain transactions. In such cases, transfers of desired metaverse currencies by computing devices 110 are made to the exchange platform 108 on behalf of the processing server 102, such that settlement can be performed without the need for an additional transfer by the processing server 102. In other cases, the exchange platform 108 can have a single blockchain wallet for each metaverse currency used for receiving the respective metaverse currency on behalf of all metaverse merchants, e.g., the processing servers 102, that utilize the exchange platform 108. In such cases, new blockchain transactions can further include an indication of the metaverse merchant, e.g., the processing server 102, to whom the transfer of $C_D$ is to be made, such as via the inclusion of a unique identification value in the new blockchain transaction. When transfer is made to the blockchain wallet of the exchange platform 108 from the computing device 110, the exchange platform 108 can identify the metaverse merchant, e.g., the processing server 102, to which it applies via the unique identification value and provide an accounting of the amount of $C_P$ for the metaverse merchant to be made during the settlement process. In such embodiments, metaverse merchants, e.g., the processing servers 102, can receive any metaverse currency without the need to operate separate blockchain wallets for each metaverse currency.

The methods and systems discussed herein provide for the facilitation of direct metaverse payments using any metaverse currency to a metaverse merchant by users without direct currency conversion, while still enabling metaverse merchants to primarily operate in their preferred metaverse currency via the use of an exchange platform and settlement processes. The result is a significant improvement in convenience for users, who do not need to maintain accounts and balances of multiple metaverse currencies, as well as vastly increasing the potential customer base for merchants, that can accept payments with additional metaverse currencies without having to maintain balances and operations using the additional currencies.

Processing Server

FIG. 2 illustrates an embodiment of the processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102.

The processing server 102 can include a receiving device 202. The receiving device 202 can be configured to receive data over one or more networks via one or more network protocols. In some instances, the receiving device 202 can be configured to receive data from blockchain nodes 106, computing devices 110, exchange platforms 108, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 106, which can be superimposed or otherwise encoded with blockchain data entries, blocks, blockchain transactions, transaction notifications, etc. The receiving device 202 can also be configured to receive data signals electronically transmitted by computing devices 110 that can be superimposed or otherwise encoded with transaction requests, public keys, digital signatures, balance verifications and certifications, new blockchain transactions, etc. The receiving device 202 can also be configured to receive data signals electronically transmitted by exchange platforms 108, which can be superimposed or otherwise encoded with exchange rates, transaction amounts, public keys, destination addresses, blockchain transactions, transaction notifications, etc.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, transaction module 222, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include blockchain data 206, which can be stored in a memory 214 of the processing server 102 or stored in a separate area within the processing server 102 or accessible thereby. The blockchain data 206 can include data associated with one or more blockchains, such as blockchain wallet data for a plurality of blockchain wallets. For example, the blockchain data 206 can include cryptographic key pairs, unspent transaction outputs, exchange rate data, wallet balances, and other data.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, configuration keys, cryptographic keys including public keys and/or private keys, communication data, blockchain algorithms and data, exchange rates, product data, transaction amounts, etc.

The processing server 102 can include a querying module 216. The querying module 216 can be configured to execute queries on databases to identify information. The querying module 216 can receive one or more data values or query strings and can execute a query string based thereon on an indicated database, such as the blockchain data 206 of the processing server 102 to identify information stored therein. The querying module 216 can then output the identified information to an appropriate engine or module of the processing server 102 as necessary. The querying module 216 can, for example, execute a query on the memory 214 to identify product costs for one or more goods or services indicated in a received transaction request for use in determining a transaction amount for the requested transaction.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate encryption keys, blockchain transactions, digital signatures, destination addresses, transaction amounts, etc.

The processing server 102 can also include a validation module 220. The validation module 220 can be configured to perform data validations and verifications for the processing server 102 as part of the functions discussed herein. The validation module 220 can receive instructions as input, can perform data validations or verification as instructed, and can output a result of the data validations or verifications to one or more modules of the processing server 102. In some cases, the input can include the data to be validated or verified and/or data to be used in the validation or verification. In other cases, the validation module 220 can be configured to identify such data, such as in the blockchain data 206 and/or memory 214. The validation module 220 can be configured to, for example, validate verify digital signatures, authenticate blockchain wallets, verify blockchain wallet balances, verify blockchain transactions added to blockchains, etc.

The processing server 102 can also include a transaction module 222. The transaction module 222 can be configured to perform actions related to blockchain transactions for the processing server 102 as part of the functions discussed herein. The transaction module 222 can receive instructions as input, can perform functions as instructed, and can output a result of the functions to one or more modules of the processing server 102. In some cases, the input can include the data to be validated or verified and/or data to be used in the validation or verification. In other cases, the transaction module 222 can be configured to identify such data, such as in the blockchain data 206 and/or memory 214. The transaction module 222 can be configured to, for example, determine transaction amounts based on indicated products, determine transaction amounts using exchange rates between metaverse currencies, create new blockchain transactions, cause new blockchain transactions to be submitted to blockchain nodes 106, perform functions related to the fulfillment of transactions, etc.

The processing server 102 can also include a transmitting device 224. The transmitting device 224 can be configured to transmit data over one or more networks via one or more network protocols. In some instances, the transmitting device 224 can be configured to transmit data to blockchain nodes 106, computing devices 110, exchange platforms 108, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to blockchain nodes 106 that can be superimposed or otherwise encoded with new blockchain transactions, requests for blockchain data, etc. The transmitting device 224 can also be configured to electronically transmit data signals to computing devices 110, which can be superimposed or otherwise encoded with equivalent transaction amounts, destination addresses, blockchain wallet data requests, transaction notifications, transaction notification requests, etc. The transmitting device 224 can also be configured to electronically transmit data signals to exchange platforms 108 that are superimposed or otherwise encoded with new blockchain transactions, blockchain data requests, destination addresses, exchange rate requests, transaction amounts, etc.

Process for Facilitating Direct Metaverse Payments

Figure 3A:
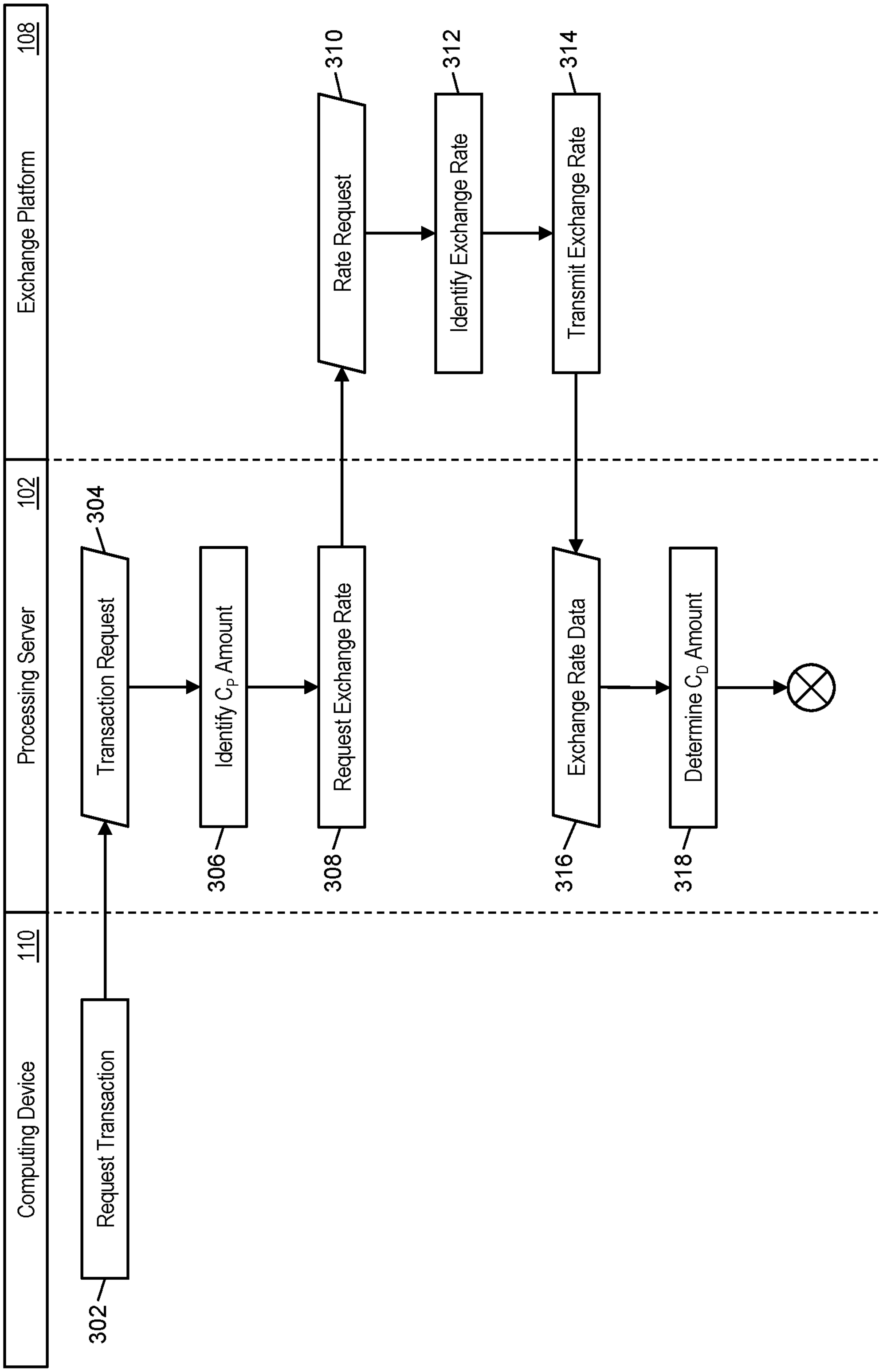
FIGS. 3A and 3B are a flow diagram illustrating a process for facilitating direct metaverse payments in the system of FIG. 1 in accordance with exemplary embodiments.
Figure 3B:
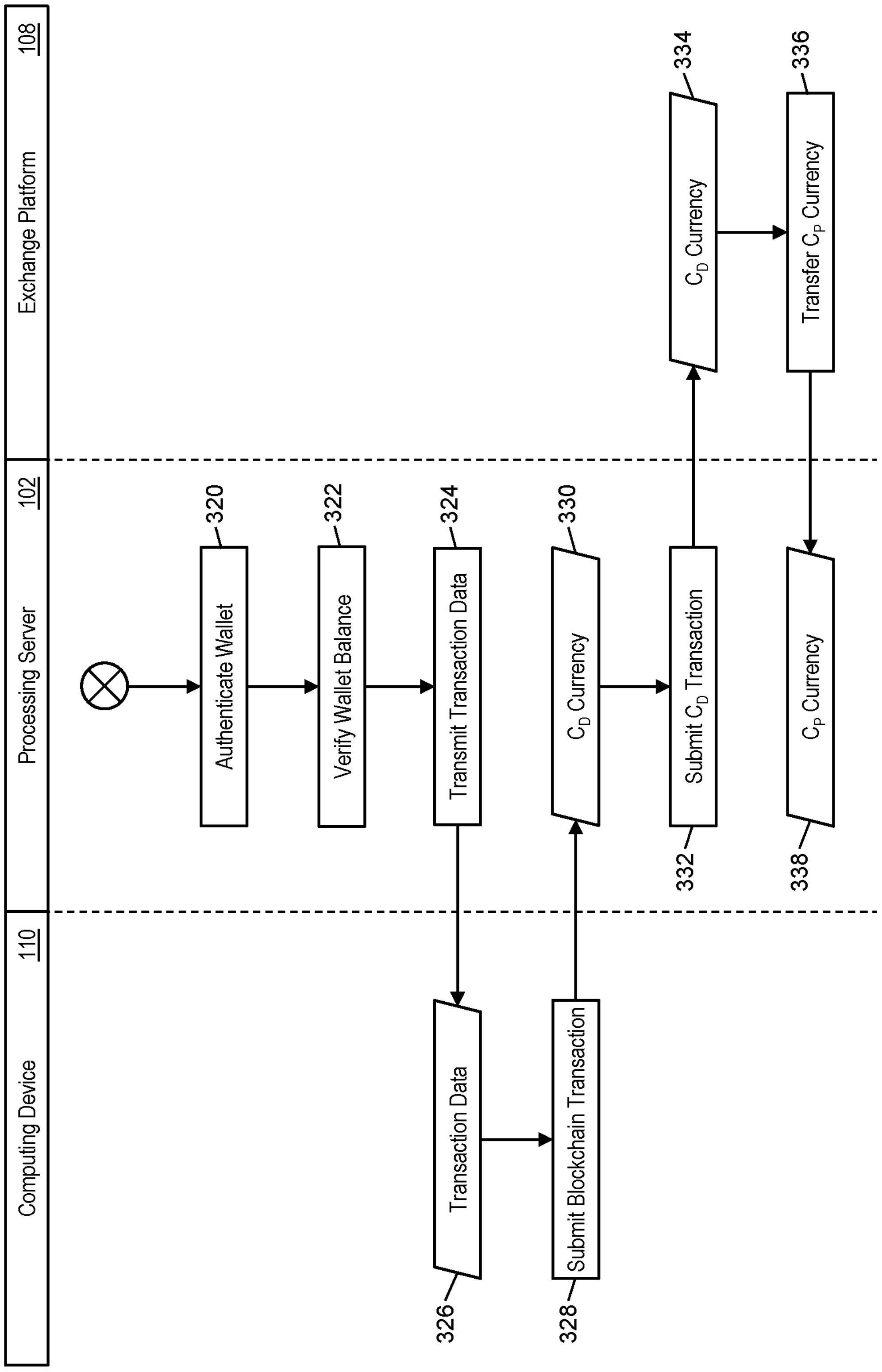

FIGS. 3A and 3B illustrate a process in the system 100 of FIG. 1 for the facilitating of direct metaverse payments without currency conversion and settlement of metaverse currencies.

In step 302, a computing device 110 of a user interested in transacting with a metaverse merchant can submit a transaction request to a processing server 102 of the metaverse merchant using a suitable communication network and method, such as via an interface provided in a metaverse. The transaction request can include one or more desired products or services, a desired metaverse currency, $C_D$, a public key of a blockchain wallet of the computing device 110 used for the desired metaverse currency, $C_D$, and one or more unspent transaction outputs of the blockchain wallet for $C_D$ that are digitally signed using the private key of the blockchain wallet. In step 304, the receiving device 202 of the processing server 102 can receive the transaction request from the computing device 110.

In step 306, the transaction module 222 of the processing server 102 can determine a transaction amount for the requested transaction in the metaverse merchant's preferred metaverse currency, $C_P$, based on the one or more desired products/services and associated costs. In step 308, the transmitting device 224 of the processing server 102 can electronically transmit a request for an exchange rate between $C_P$ and $C_D$ to an exchange platform 108 using a suitable communication network and method. In some cases, the request can include the determined transaction amount in the metaverse merchant's preferred metaverse currency, $C_P$. In step 310, the exchange platform 108 can receive the request for an exchange rate. In step 312, the exchange platform 108 can identify the exchange rate between $C_P$ and $C_D$ and, in step 314, electronically transmit the identified exchange rate back to the processing server 102 using a suitable communication network and method. In embodiments, the processing server 102 may store one or more exchange rates between the metaverse merchant's preferred metaverse currency, $C_P$, and one or more other metaverse currencies, e.g., $C_D$, in the memory 214. For example, the processing server 102 may store one or more exchange rates that are used most frequently with the exchange platform 108. In such embodiments, the processing server 102 may execute, via the querying module 216, a query on the memory 214 to identify the relevant exchange rate between $C_P$ and C.

In step 316, the receiving device 202 of the processing server 102 can receive the exchange rate from the exchange platform 108. In step 318, the transaction module 222 of the processing server 102 can determine the equivalent transaction amount for the requested transaction in $C_D$ based on the determined transaction amount in $C_P$ and the exchange rate. In step 320, the validation module 220 of the processing server 102 can authenticate the computing device's blockchain wallet by verifying the digital signature using the public key included in the received transaction request. Upon successful authentication, the validation module 220 of the processing server 102 can, in step 322, verify that the account balance in $C_D$ of the blockchain wallet can cover the equivalent transaction amount, such as by comparing a combined value for each of the unspent transaction outputs in the transaction request to the equivalent transaction amount. In step 324, the transmitting device 224 of the processing server 102 can electronically transmit transaction data to the computing device 110 for proceeding with the requested transaction. The transaction data can include the equivalent transaction amount and a destination address for a blockchain wallet of the processing server 102 used to receive payment in $C_D$.

In step 326, the computing device 110 can receive the transaction data from the processing server 102. In step 328, the computing device 110 can generate a new blockchain transaction for payment of the equivalent transaction amount from the computing device 110 to the processing server 102 using the unspent transaction outputs, digital signature, destination address, equivalent transaction amount, and any other data, which can be electronically transmitted to a blockchain node 106 in the blockchain network 104 that operates the blockchain for the desired metaverse currency. The blockchain node 106 can receive the new blockchain transaction, verify the blockchain transaction, and add the new blockchain transaction to the blockchain using traditional methods and systems. As a result, in step 330, the processing server's blockchain wallet for $C_D$ can receive the payment of the equivalent transaction amount of $C_D$ for use in future transactions.

After receiving the payment from the user, in step 332, the transaction module 222 of the processing server 102 can generate another blockchain transaction for payment of the received equivalent transaction amount of $C_D$ from the processing server 102 to the exchange platform 108, which can be transmitted to a blockchain node 106 in the blockchain network 104 by the transmitting device 224 of the processing server 102 using a suitable communication network and method. The blockchain node 106 can receive the additional blockchain transaction, verify the blockchain transaction, and add the additional blockchain transaction to the blockchain using traditional methods and systems. As a result, in step 334, the exchange platform's blockchain wallet for $C_D$ can receive the payment of the equivalent transaction amount of $C_D$ from the metaverse merchant. The exchange platform 108 can accumulate payments from the processing server 102 in various metaverse currencies and convert the amounts to the metaverse merchant's preferred metaverse currency. As part of a settlement process, the exchange platform 108 can, in step 336, submit a third blockchain transaction to a blockchain node 106 in a blockchain network 104 that manages the blockchain for the preferred metaverse currency, for transfer of the accumulated amount of $C_P$ from the exchange platform to the appropriate blockchain wallet of the processing server 102. The third blockchain transaction can be added to the blockchain for $C_P$ using traditional systems and methods which can result with the processing server 102 receiving, in step 338, $C_P$ currency from the exchange platform for use in future transactions.

Exemplary Method for Facilitating Direct Metaverse Payments

Figure 4:
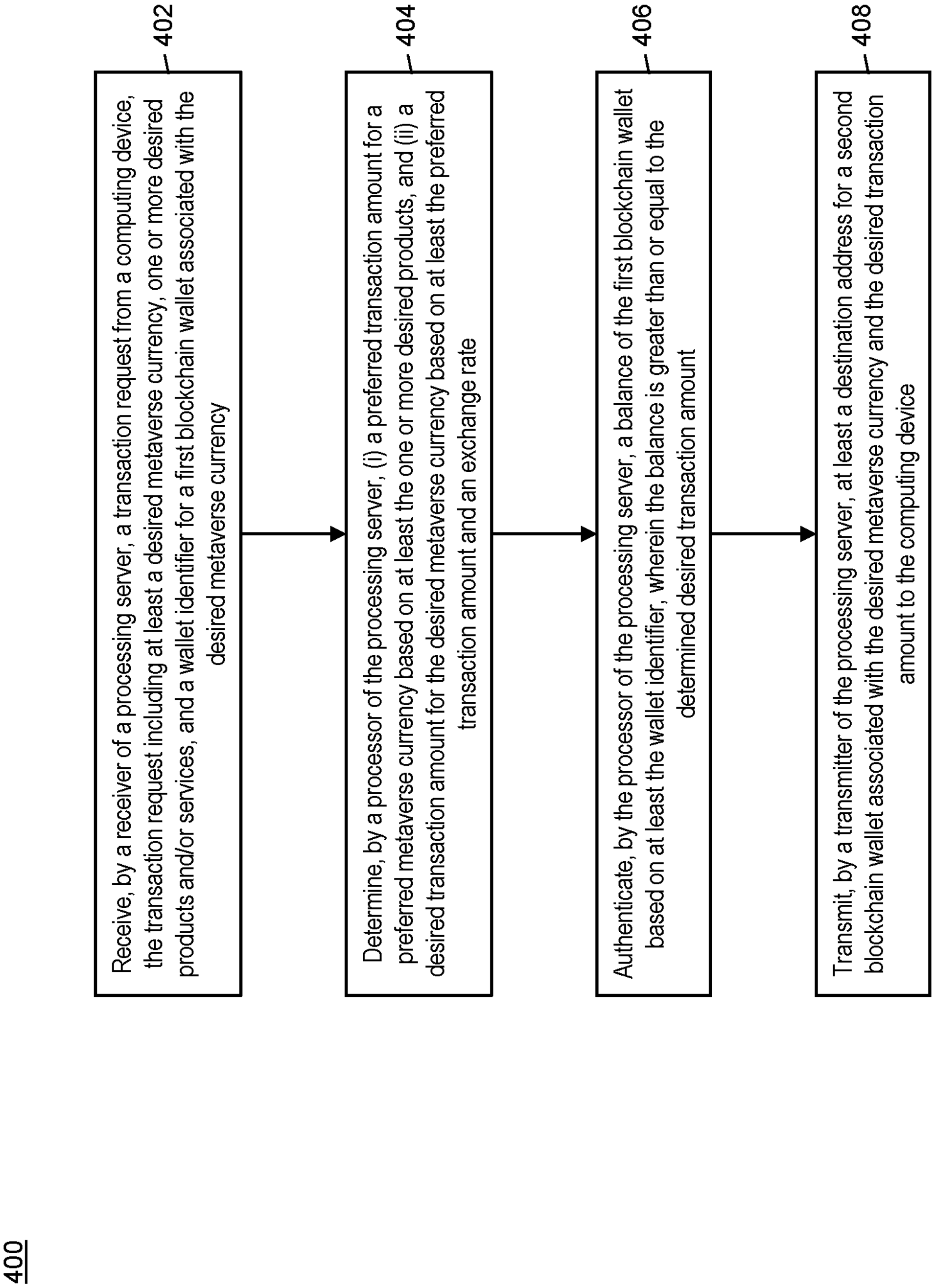
FIG. 4 is a flow chart illustrating an exemplary method facilitating direct metaverse payments via metaverse currency without direct currency conversion in accordance with exemplary embodiments.

FIG. 4 illustrates a method 400 for facilitating direct payments of metaverse currency without direct currency conversion.

In step 402, a transaction request can be received by a receiver (e.g., receiving device 202) of a processing server (e.g., processing server 102) from a computing device (e.g., computing device 110), the transaction request including at least a desired metaverse currency, one or more desired products and/or services, and a wallet identifier for a first blockchain wallet associated with the desired metaverse currency. In step 404, a processor (e.g., transaction module 222) of the processing server (e.g., processing server 102) can determine (i) a preferred transaction amount for a preferred metaverse currency based on at least the one or more desired products, and (ii) a desired transaction amount for the desired metaverse currency based on at least the preferred transaction amount and an exchange rate.

In step 406, the processor (e.g., validation module 220) of the processing server (e.g., processing server 102) can authenticate a balance of the first blockchain wallet based on at least the wallet identifier, wherein the balance is greater than or equal to the determined desired transaction amount. In step 408, at least a destination address for a second blockchain wallet associated with the desired metaverse currency and the desired transaction amount can be transmitted by a transmitter (e.g., transmitting device 224) of the processing server (e.g., processing server 102) to the computing device (e.g., computing device 110).

In one embodiment, the method 400 can further include: identifying, by the processor (e.g., querying module 214) of the processing server (e.g., processing server 102), a blockchain data entry stored in a blockchain associated with the desired metaverse currency that includes at least the destination address; and verifying, by the processor (e.g., validation module 220) of the processing server (e.g., processing server 102), that a transferred transaction amount in the blockchain data entry is greater than or equal to the desired transaction amount. In some embodiments, the method 400 can also include transmitting, by the transmitter (e.g., the transmitting device 224) of the processing server (e.g., processing server 102), at least the determined transaction amount and preferred metaverse currency to an exchange platform system (e.g., exchange platform 108).

In one embodiment, the method 400 can further include: transmitting, by the transmitter (e.g., the transmitting device 224) of the processing server (e.g., processing server 102), a blockchain transaction to a blockchain node (e.g., blockchain node 106) in a blockchain network (e.g., blockchain network 104) associated with the desired metaverse currency, wherein the blockchain transaction includes at least the desired transaction amount for transfer to an exchange platform system (e.g., exchange platform 108). In a further embodiment, the method 400 can even further include identifying, by the processor (e.g., querying module 214) of the processing server (e.g., processing server 102), a blockchain data entry stored in a blockchain associated with the preferred metaverse currency that includes a transfer of the preferred transaction amount from the exchange platform system (e.g., exchange platform 108) to a third blockchain wallet associated with the preferred metaverse currency.

In some embodiments, the preferred transaction amount can be included in the transaction request. In one embodiment, the method 400 can also include receiving, by the receiver (e.g., receiving device 202) of the processing server (e.g., processing server 102), the exchange rate from an exchange platform system (e.g., exchange platform 108). In some embodiments, the transaction request can further include at least a digital signature over one or more unspent transaction outputs, the wallet identifier can be a public key of a cryptographic key pair of the first blockchain wallet, and authenticating the balance of the first blockchain wallet can include validating the digital signature using the public key.

Computer System Architecture

FIG. 5 illustrates a computer system 500 in which embodiments of the present disclosure, or portions thereof, can be implemented as computer-readable code. For example, the processing server 102, blockchain nodes 106, exchange platform 108, and computing devices 110 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating direct metaverse payments via metaverse currency without direct currency conversion. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for facilitating direct metaverse payments via metaverse currency without direct currency conversion, comprising:

receiving, by a receiver of a processing server, a transaction request from a computing device, the transaction request including at least a desired metaverse currency, one or more desired products and/or services, and a wallet identifier for a first blockchain wallet associated with the desired metaverse currency;

determining, by a processor of the processing server, (i) a preferred transaction amount for a preferred metaverse currency based on at least the one or more desired products, wherein the preferred metaverse currency is a different metaverse currency than the desired metaverse currency, and (ii) a desired transaction amount for the desired metaverse currency based on at least the preferred transaction amount and an exchange rate;

authenticating, by the processor of the processing server, a balance of the first blockchain wallet based on at least the wallet identifier, wherein the balance is greater than or equal to the determined desired transaction amount;

transmitting, by a transmitter of the processing server, at least a destination address for a second blockchain wallet associated with the desired metaverse currency and the desired transaction amount to the computing device; and transmitting, by the transmitter of the processing server, a blockchain transaction to a blockchain node in a blockchain network associated with the desired metaverse currency, wherein the blockchain transaction includes at least the desired transaction amount for transfer to an exchange platform system.

2. The method of claim 1, further comprising:

identifying, by the processor of the processing server, a blockchain data entry stored in a blockchain associated with the desired metaverse currency that includes at least the destination address; and verifying, by the processor of the processing server, that a transferred transaction amount in the blockchain data entry is greater than or equal to the desired transaction amount.

3. The method of claim 1, further comprising:

transmitting, by the transmitter of the processing server, at least the determined transaction amount and preferred metaverse currency to an exchange platform system.

4. The method of claim 1, further comprising:

identifying, by the processor of the processing server, a blockchain data entry stored in a blockchain associated with the preferred metaverse currency that includes a transfer of the preferred transaction amount from the exchange platform system to a third blockchain wallet associated with the preferred metaverse currency.

5. The method of claim 1, wherein the preferred transaction amount is included in the transaction request.

6. The method of claim 1, further comprising:

receiving, by the receiver of the processing server, the exchange rate from an exchange platform system.

7. The method of claim 1, wherein the transaction request further includes at least a digital signature over one or more unspent transaction outputs, the wallet identifier is a public key of a cryptographic key pair of the first blockchain wallet, and authenticating the balance of the first blockchain wallet includes validating the digital signature using the public key.

8. A system for facilitating direct metaverse payments via metaverse currency without direct currency conversion, comprising:

a computing device;

an exchange platform system;

a blockchain node in a blockchain network associated with the desired metaverse currency; and a processing server, the processing server including a receiver configured to receive a transaction request from the computing device, the transaction request including at least a desired metaverse currency, one or more desired products and/or services, and a wallet identifier for a first blockchain wallet associated with the desired metaverse currency, a processor configured to:

determine (i) a preferred transaction amount for a preferred metaverse currency based on at least the one or more desired products, wherein the preferred metaverse currency is a different metaverse currency than the desired metaverse currency, and (ii) a desired transaction amount for the desired metaverse currency based on at least the preferred transaction amount and an exchange rate, and authenticate a balance of the first blockchain wallet based on at least the wallet identifier, wherein the balance is greater than or equal to the determined desired transaction amount, and a transmitter configured to:

transmit at least a destination address for a second blockchain wallet associated with the desired metaverse currency and the desired transaction amount to the computing device, and transmit a blockchain transaction to the blockchain node, wherein the blockchain transaction includes at least the desired transaction amount for transfer to the exchange platform system.

9. The system of claim 8, wherein the processor of the processing server is further configured to:

identify a blockchain data entry stored in a blockchain associated with the desired metaverse currency that includes at least the destination address, and verify that a transferred transaction amount in the blockchain data entry is greater than or equal to the desired transaction amount.

10. The system of claim 8, wherein the transmitter of the processing server is configured to transmit at least the determined transaction amount and preferred metaverse currency to the exchange platform system.

11. The system of claim 8, wherein the processor of the processing server is configured to identify a blockchain data entry stored in a blockchain associated with the preferred metaverse currency that includes a transfer of the preferred transaction amount from the exchange platform system to a third blockchain wallet associated with the preferred metaverse currency.

12. The system of claim 8, wherein the preferred transaction amount is included in the transaction request.

13. The system of claim 8, further comprising:

an exchange platform system, wherein the receiver of the processing server is configured to receive the exchange rate from the exchange platform system.

14. The system of claim 8, wherein the transaction request further includes at least a digital signature over one or more unspent transaction outputs, the wallet identifier is a public key of a cryptographic key pair of the first blockchain wallet, and authenticating the balance of the first blockchain wallet includes validating the digital signature using the public key.

* * * * *